US006673396B2

(12) United States Patent
Fabian

(10) Patent No.: US 6,673,396 B2
(45) Date of Patent: Jan. 6, 2004

(54) METHOD FOR PRODUCING AN SIO₂ BLANK BY ADJUSTING SHAPE OF DEPOSITION BURNER FLAME

(75) Inventor: Heinz Fabian, Grossostheim (DE)

(73) Assignee: Heraeus Quarzglas GmbH & Co. KG, Hanau (DE)

(*) Notice: Subject to any disclaimer, the term of this patent is extended or adjusted under 35 U.S.C. 154(b) by 74 days.

(21) Appl. No.: 10/045,339

(22) Filed: Nov. 7, 2001

(65) Prior Publication Data
US 2002/0090466 A1 Jul. 11, 2002

(30) Foreign Application Priority Data
Nov. 8, 2000 (DE) ......................... 100 55 357

(51) Int. Cl.⁷ ................................. B05D 1/06
(52) U.S. Cl. .................. 427/475; 427/481; 427/189
(58) Field of Search ................. 427/579, 583, 427/255.37, 189, 180, 458, 475, 481

(56) References Cited

U.S. PATENT DOCUMENTS

| 4,735,633 A | * | 4/1988 | Chiu | 588/247 |
| 5,698,177 A | * | 12/1997 | Pratsinis et al. | 423/613 |
| 5,861,132 A | * | 1/1999 | Pratsinis et al. | 423/613 |
| 6,003,342 A | | 12/1999 | Ishida et al. | |
| 6,380,110 B1 | * | 4/2002 | Werdecker et al. | 501/54 |

FOREIGN PATENT DOCUMENTS

DE    196 29 170 A1    1/1998
DE    44 16 351 A1    11/1999

OTHER PUBLICATIONS

English–language Abstract for DE 196 29 170.

* cited by examiner

Primary Examiner—Bret Chen
(74) Attorney, Agent, or Firm—Tiajoloff & Kelly; Andrew L. Tiajoloff

(57) ABSTRACT

In a known method for producing an SiO₂ blank, SiO₂ particles are formed in a burner flame of a deposition burner and are deposited under the effect of an electrical field on a substrate. Starting therefrom, in order to indicate a simple and inexpensive method by means of which blanks can be produced with a predetermined, in particular axially homogeneous, mass and density distribution, it is suggested according to the invention that the geometrical shape of the burner flame (8) is adjusted by the effect of the electrical field (9) in dependence upon the geometrical parameter of a deposition surface (12; 21) of the substrate (1) that is assigned to the burner flame (8). An apparatus suited for performing the method comprises a substrate, at least one deposition burner for producing SiO₂ particles in a burner flame assigned to the deposition burner, a measuring device for sensing a geometrical parameter in the area of a deposition surface of the SiO₂ blank, and a pair of electrodes connected to a source of voltage for producing an electrical field (9) which is operative in the area of the burner flame and is adjustable in dependence upon the geometrical parameter of that deposition surface (21; 21) of the substrate that is assigned to the burner flame (8).

10 Claims, 3 Drawing Sheets

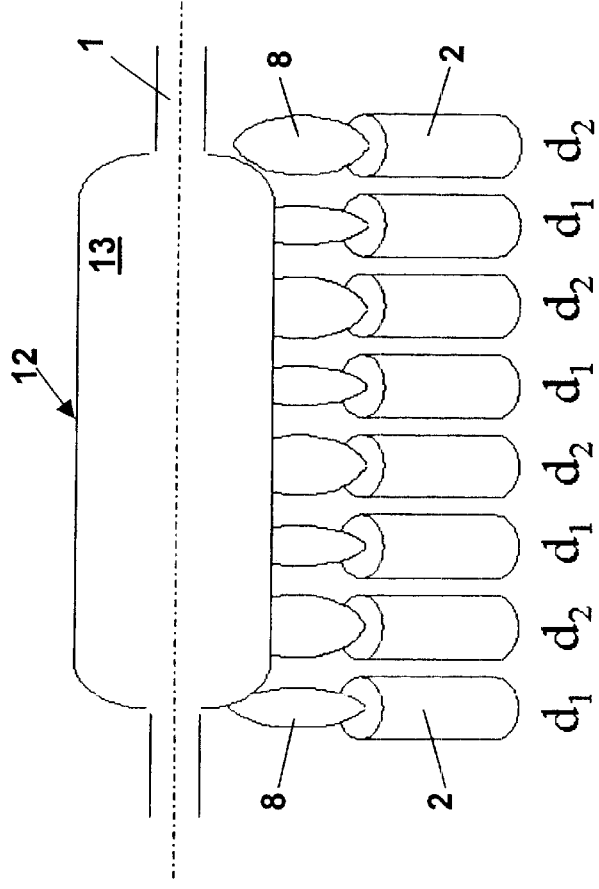
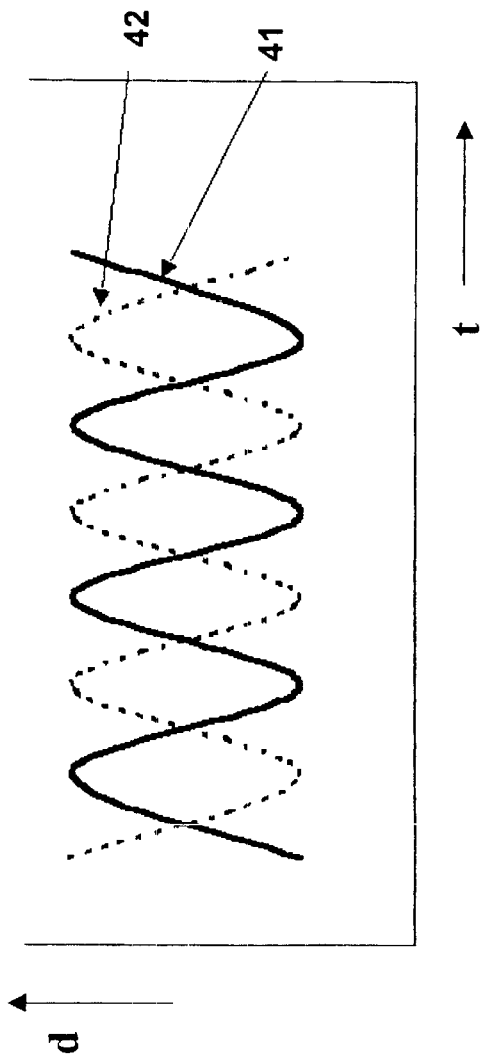

METHOD FOR PRODUCING AN SIO₂ BLANK BY ADJUSTING SHAPE OF DEPOSITION BURNER FLAME

FIELD OF THE INVENTION

The present invention relates to a method for producing an $SiO_2$ blank, wherein $SiO_2$ particles are formed in a burner flame of a deposition burner and deposited under the effect of an electrical field on a substrate.

Furthermore, the present invention relates to a method for producing an $SiO_2$ blank, using several deposition burners which are arranged at an equal distance from one another along a substrate rotating about a longitudinal axis and which have each assigned thereto a burner flame in which $SiO_2$ particles are formed and deposited on the substrate under the effect of an electrical field.

Moreover, the present also relates to an apparatus for producing an $SiO_2$ blank, the apparatus comprising a substrate, at least one deposition burner for producing $SiO_2$ particles in a burner flame assigned to the deposition burner, a measuring device for sensing a size (or shape) in the area of a deposition surface of the $SiO_2$ blank, and a pair of electrodes connected to a source of voltage for producing an electrical field which is operative in the area of the burner flame.

BACKGROUND OF THE INVENTION

A method and an apparatus of the above-mentioned type are known from DE-A1 196 29 170. For producing a porous cylindrical $SiO_2$ body (hereinafter also designated as a "soot body"), $SiO_2$ particles are produced in the oxyhydrogen gas flame of a plurality of hydrolysis burners and are deposited layerwise on a horizontally oriented carrier tube rotating about its longitudinal axis. The burners are mounted at an equal distance of about 15 cm relative to one another on a burner block extending in parallel with the longitudinal axis of the carrier tube. The burner block is reciprocated along the developing porous cylindrical preform between a left and a right reversal point by means of a controllable displacement device, with the amplitude of the translatory movement of the burner block being smaller than the length of the preform.

To increase the deposition rate of the $SiO_2$ particles, an electrical field is applied between the carrier tube and the hydrolysis burners. To this end an electrode is provided in the inner bore of the carrier tube, the second electrode (outer electrode) is formed by an elongated metallic mesh which is either connected to the burner block or arranged between the hydrolysis burners and the carrier tube. A potential difference of a few 10 kV is maintained between the two electrodes by means of an electrical DC source. The electrical field produces an electrostatic charge of the dielectric $SiO_2$ particles which are thereby accelerated towards the soot body. This results in an improvement of the deposition efficiency in comparison with a conventional method without said electrostatic charge.

In the manufacture of such soot bodies as a starting material for preforms for optical fibers, the homogeneity of the soot body poses problems as a rule. To achieve deposition conditions that are as uniform as possible and to obtain an axially homogeneous soot body, charge points which copy the spatial shape of the soot body are produced in the known method by means of the outer electrode. However, it is not possible to avoid local overheating of the soot body caused, in particular, by the body being heated twice in quick succession upon reversal of the direction of movement in the area of the reversal points. This thermal effect is particularly noticed during use of a burner block, for local overheating and thus axial density and mass variations in the blank may take place over the entire blank surface due to the many reversal points of the burner. Density and mass variations, however, result in areas of different reactivity in the blank; these are particularly noticed in the subsequent chemical reactions during processing into a preform and may e.g. leave inhomogeneities after sintering.

Constructional differences of different deposition burners result in different depositions rates and in different temperatures of the burner flame, which may also be noticed in density and mass changes within the blank. This requires considerable adjusting and correcting efforts after every exchange of a deposition burner.

Moreover, on account of the mass and size of the $SiO_2$ blank which are increasing in the course of the deposition process, there arise thermal effects which may influence the deposition rate and the temperature during deposition and may thus also lead to radial or axial changes in the density or mass of the blank.

SUMMARY OF THE INVENTION

It is therefore the object of the present invention to indicate a simple and inexpensive method by means of which blanks can be produced with a predetermined, in particular axially homogeneous mass and density distribution, and to provide a simple apparatus which is suited for carrying out the method.

As for the method, this object, starting on the one hand from the above-mentioned method, is achieved according to the invention in that the geometrical shape of said burner flame is adjusted by the effect of said electrical field in dependence upon the geometrical parameter of the deposition surface.

In the method according to the invention an electrical field is produced which acts on the geometrical shape of the burner flame, thereby changing the same either by changing the field strength operative in the area of the burner flame, or by measures which change the direction of the field lines in the area of the burner flame. A change in the field strength acting on the burner flame or a change in the direction of the field lines effects a change in the burner flame geometry.

This effect of the electrical field on the geometry of the burner flame is used for achieving a homogeneous density and mass distribution within the $SiO_2$ blank by adjusting the geometrical shape of the burner flame in dependence upon a geometrical parameter of a burner flame-assigned deposition surface of the substrate. Geometrical parameter in this sense means a geometrical dimension, for instance a length or a diameter, or a geometrical shape, for instance a curvature. The expression "size or shape of the deposition surface" will also be used hereinafter as a more illustrative synonym for the "geometrical parameter of the deposition surface".

For instance, local deviations in the shape or size of the deposition surface can be compensated or avoided in that the width of the burner flame is decreased or increased accordingly by the effect of the electrical field in this area. To this end the shape or size of the deposition surface is sensed. Such a sensing operation may be carried out either during or after the deposition process. In the last-mentioned case, the deposition surface of the blank is measured, so that in the case of local deviations in the size or shape of the deposition surface, these can be compensated in the next process by suitable changes in the burner flame in this area of the deposition surface. Size or shape of the deposition surface is sensed by directly measuring the respective dimension, or by determining a characteristic value which can be correlated with the geometrical dimension of the deposition surface, e.g. the deposition duration, the weight or volume of the blank.

Moreover, the method according to the invention permits a continuous adaptation of the geometrical shape of the burner flame to the size or shape of the deposition surface. For instance, it is possible to adjust a small burner flame at the beginning of a deposition process and then to expand the flame continuously or stepwise with an increasing outer diameter of the blank. Such a procedure can be used not only for a homogenization as to the radial and axial mass and density distribution, but also helps to increase the deposition efficiency of the $SiO_2$ particle deposition.

The adjustment of the electrical field and the local size or shape of the deposition surface are correlated with one another such that a predetermined electrical field acts on the burner flame in dependence upon the size or shape of the deposition surface such that a selective adjustment of the geometrical shape of the burner flame is made possible. This can e.g. be achieved in that the electrical field is locally shifted according to the deposition surface to be locally changed, e.g., following the movement of sequence of the deposition burner, and is thereby changed in time. Or also by the measure that a locally fixed, but time-variable, electrical field is produced, whose effect on the burner flame differs, depending on the local size or shape of the deposition surface. The deposition burner may move along the substrate, or it may be fixed locally.

In any case, the burner flame assigned to the deposition burner is subjected to a "time change in the electrical field acting thereon", which is also called "field change" in the following.

With the method of the invention, the burner flame and thus the surface temperature and the density and mass distribution can solely be varied by the "field change" within a wide range. A change in flow speeds or gas amounts is not necessary. Thus blanks of a predetermined mass and density distribution can be produced, requiring comparatively small control and adjustment efforts.

The effect of the electrical field on the burner flame is due to the electrically charged particles in the burner flame. These may be ionized particles or electrostatically charged particles. Ionized particles are predominantly concentrated in the lower portion of the burner flame, so that the effect of the electrical field is greater than in the upper portion of the burner flame.

$SiO_2$ blank means a body which, apart from dopants, entirely consists of $SiO_2$. The burners known in the production of synthetic quartz glass, in particular oxyhydrogen burners and plasma burners, are suited as deposition burners.

A "field change" has an effect on the expansion of the burner flame in the direction of the field lines. The field lines can extend in the direction of propagation of the burner flame. Preferably, however, the field lines extend within the burner flame substantially in a direction perpendicular to the direction of propagation of the burner flame, so that a "field change" has an effect on the lateral expansion of the burner flame. It is thereby possible to enlarge or narrow the burner flame in a particularly easy way. In comparison with a state without an electrical field, the maximum flame diameter can be expanded by a multiple, which depends on the optimum operative range of the burner flame without an electrical field. Distinct effects regarding mass distribution and maximum temperature are observed in the case of flame expansions starting from about 20% of the initial diameter (without electrical field). An expansion by more than five times is normally outside the optimum working range of the burner flame to such a degree that this entails losses in the deposition rate.

In the case of a deposition surface in the form of an outer cylindrical surface, the outer diameter thereof is preferably determined, the width of the burner flame being set in dependence upon the outer diameter by the effect of the electrical field. Width of the burner flame means here the dimension of the flame perpendicular to the main propagation direction. In principle, the width can be varied in any desired direction, preferably in the direction of the cylinder axis of the deposition surface or in a direction perpendicular thereto. In the case of deposition burners which are adjacent in the direction of the cylinder axis, the last-mentioned variant has the advantage that the neighboring burner flames do not substantially affect one another upon an enlargement.

A particularly advantageous effect on the homogeneity of the axial density and mass distribution is observed when the geometrical parameter of the deposition surface is determined continuously, and when the geometrical shape of the burner flame is varied in dependence upon the geometrical parameter. Deviations from a predetermined setpoint value or mean value of the size or the shape of the deposition surface can thereby be sensed and compensated rapidly. Moreover, such a procedure permits a continuous adaptation of the geometrical shape of the burner flame to the geometrical parameter of the deposition surface. "Continuous determination of the deposition surface" means here both a continuous detection of the size or shape and a detection from time to time.

A procedure is preferred, wherein use is made of several deposition burners which are arranged along the substrate and are axially spaced apart from one another and which during the predetermined sequence of movement are reciprocated in synchronism along the developing blank between reversal points, and wherein a deposition surface is assigned to each deposition burner and the geometrical parameter is determined for each deposition surface, and the geometrical shape of the respective burner flame is individually adjusted by the effect of the electrical field in dependence upon the determined geometrical parameter of the deposition surface.

The deposition burners show the same sequence of movement along the substrate. The path between the reversal points of the burner movement will be designated in the following as "path of movement". The burner flames of the deposition burners are individually influenced and varied along their "path of movement" by a "field change" in accordance with the size or shape of their deposition surface.

Each of the deposition burners has assigned thereto at least one pair of electrodes for producing the electrical field in the area of the burner flame assigned to it or along the respective "path of movement". The field lines extend preferably in a direction perpendicular to or in parallel with the longitudinal axis of the substrate and the main propagation direction of the burner flames.

It has been found to be of advantage when the geometrical dimension of the respective deposition surfaces is controlled; the electrical fields respectively assigned to the burner flames serving as a manipulated variable for the control. The shape of the respective burner flame is influenced via the respective electrical fields, as described above. The control permits an exact observance of a predetermined desired size or shape of the deposition surface or of a mean value which is uniform over the length of the blank.

It has turned out to be also particularly useful when a synchronous change in the respective electrical fields, which is correlated with the sequence of movement, is superposed on the individual adjustment of the electrical fields assigned to the burner flames. The synchronous change in the respective electrical fields that is correlated with the sequence of movement permits a position-dependant adaptation of the burner flames, independently of the size and shape of the deposition surface. Such an adaptation of the burner flames will e.g. be of advantage when regularly recurring changes in the surface temperature arise in dependence upon the position of the deposition burners in the burner movement, as is the case with oscillating deposition burners in the area of the reversal points.

It has been found to be of advantage when the electrical field is set such that a sudden gas discharge is avoided. According to the invention the electrical field primarily influences the geometrical shape of the burner flame, but not the formation of the $SiO_2$ or dopant particles. A sudden gas discharge, e.g. in the form of an arc or glow discharge or in the form of a spark, may produce inhomogeneities in the depositing process and is therefore avoided, if possible.

According to the invention the above-mentioned technical object is also achieved on the other hand in that, starting from the above-mentioned method and using several deposition burners arranged at an equal distance from one another along a substrate rotating about a longitudinal axis, the width of the respective burner flame, when viewed in the direction of the longitudinal axis of the substrate, is changed by means of an electrical field acting thereon within a predetermined change cycle such that the change cycles of neighboring burner flames are synchronous and phase-shifted.

In this process, use is made of a plurality of deposition burners (hereinafter designated as "row of burners") which are arranged at an equal distance from one another along a substrate rotating about a longitudinal axis. An electrical field which effects a cyclic change in the geometrical shape of the burner flame acts on the burner flames of the deposition burners. In the simplest case each burner flame has assigned thereto a separate electrical field. Since the "field change" takes place synchronously, the control efforts are small. The "field change" may take place in steps or continuously. Of essential importance is here that the change cycles of neighboring burner flames are phase-shifted, preferably in phase opposition. In the case of change cycles in phase opposition, e.g. one of the deposition burners has a comparatively small burner flame producing a high surface temperature with a narrow mass distribution of the deposited $SiO_2$ particles while at the same time the two neighboring deposition burners produce a comparatively wide burner flame and thus a correspondingly low surface temperature with a simultaneously broader mass distribution. It is thereby possible to avoid not only temperature peaks, but also to minimize axial density and mass variations in a locally fixed, i.e. non-oscillating, row of burners. Reference is made to the above explanations regarding the effects of the electrical field on the burner flame and on the definitions of the terms.

Irrespective of the synchronized "field change", the burner flame of each deposition burner can also be adjusted individually by an electrical field acting thereon. Constructional differences of the deposition burners can thus be compensated.

As for the apparatus, the above-indicated object, starting from the above-described apparatus, is achieved according to the invention in that the electrical field can be adjusted in dependence upon a geometrical parameter of a deposition surface of the substrate, the deposition surface being assigned to the burner flame.

In dependence upon the geometrical parameter (hereinafter also called again "size or shape") of a deposition surface assigned to the burner flame, the apparatus according to the invention predetermines a "field change" in the sense of the above-explained method by which the geometry of the burner flame is influenced. The size or shape of the deposition surface is sensed by means of the measuring device.

The field change can e.g. be achieved in that the electrical field is locally shifted according to the deposition surface to be locally changed, e.g. in accordance with the sequence of movement of the deposition burner, and is thereby changed in time. Or also by the measure that a locally fixed, but time-variable, electrical field is produced, the effect of said field on the burner flame being different, depending on the local size or shape of the deposition surface. The deposition burner can be moved along the substrate or can be fixed locally. At any rate the burner flame assigned to the deposition burner is subjected to a time change in the electrical field acting thereon (field change).

With the apparatus according to the invention, it is possible to assign a specific effect of the electrical field acting on the burner flame, namely in dependence upon the size or shape of a deposition surface assigned to the burner flame, and thus a typical burner flame. A predetermined axial or radial density distribution can thereby be set in the blank in a targeted way. As for the generation and effect of the electrical field on the burner flame, reference is made to the above explanations on the method according to the invention. With the apparatus according to the invention, it is possible to produce a blank with a predetermined density distribution, the efforts regarding control and adjustment being here comparatively small.

As has already been explained above, the burners known in the production of synthetic quartz glass, in particular oxyhydrogen burners and plasma burners, are suited as deposition burners.

Preferably, the pair of electrodes is arranged laterally relative to the burner flame. The electrodes are oppositely arranged around the burner flame, so that the field lines within the burner flame extend substantially in a direction perpendicular to the propagation direction of the flame. In preferred special cases, the pair of electrodes is laterally arranged relative to the burner flame, i.e. when viewed in the direction of the longitudinal axis of the substrate or in a direction perpendicular thereto. In the first-mentioned case, the electrodes are opposite each other such that the electrical field lines extend in a direction parallel to the longitudinal axis of the carrier, resulting in a propagation of the burner flame in the direction of the longitudinal axis of the substrate due to the electrical field. In the last-mentioned case, however, the electrodes face each other such that the electrical field lines extend in a direction perpendicular to the longitudinal direction of the carrier, resulting in a propagation of the burner flame in a direction perpendicular to the longitudinal axis of the substrate due to the electrical field.

It has been found to be particularly useful when the pair of electrodes are plate electrodes which are arranged in the lower portion of the burner flame. The flat sides of the plates extend here in parallel with the main propagation direction of the burner flame. It is thus possible to produce a homogeneous electrical field over a long distance. Since ionized particles in the lower portion of the burner flame are present in higher concentrations than in the upper portion, the arrangement of the electrodes in this area of the burner flame yields a higher efficiency with respect to the "field change".

Expediently, the source of voltage and the measuring device are connected to a control device by means of which the electrical field can be adjusted in dependence upon the parameter the deposition burner as sensed by means of the measuring device.

The source of voltage is connected to the control device. The control device keeps the size or shape of the deposition surface at a predetermined setpoint value or at a mean value in that the burner flame of the deposition burner is adapted individually by applying an electrical field by means of the source of voltage. Hence, depending on the deposition surface, a typical burner flame can be assigned to the deposition burner by means of the control device by changing the electrical field. A change in the field strength or a change in the direction of the field lines has an effect on the burner flame, in particular on the geometry or temperature thereof. A predetermined axial or radial density and mass distribution within the blank can thereby be set in a selective way.

The control device correlates the adjustment of the electrical field and thus the property of the burner flame with the data regarding size or shape of the deposition burner. A blank of a predetermined mass and density distribution can thereby be produced, requiring comparatively small control and adjustment efforts.

In a particularly preferred development of the apparatus according to the invention, the substrate has arranged therealong a plurality of axially spaced-apart deposition burners which can be reciprocated in synchronism by means of a drive device during a predetermined sequence of movement along the developing blank between reversal points, each deposition burner having assigned thereto a pair of electrodes for producing the electrical field in the area of the burner flame assigned to it.

All of the deposition burners show the same sequence of movement along the blank. The burner flames of the deposition burners can each be adjusted by means of a control device in dependence upon the position with the help of an electrical field acting thereon; the temperatures of all burner flames can thereby be adjusted in dependence upon the position of the respective deposition burner. What is essential is that each deposition burner has assigned thereto a pair of electrodes for producing the electrical field in the area of the burner flame assigned to it. It is thereby possible to generate the electrical field in the direct vicinity of the respective burner flame. The electrodes of the pair of electrodes are here preferably arranged laterally with respect to the burner flame, so that the field lines intersect the respective burner flame substantially in a direction perpendicular to the propagation direction thereof. The field lines can extend in a direction perpendicular to or in parallel with the longitudinal axis of the substrate, or at any desired intermediate angle.

BRIEF DESCRIPTION OF THE DRAWINGS

The invention shall now be explained in more detail with reference to embodiments and a drawing which is a schematic view showing in detail in FIG. 1: an embodiment of the apparatus according to the invention for performing the method according to the invention, in a side view;

FIG. 4: a diagram of the flame diameter as a function of time in a mode of operation with an opposite change phase of neighboring deposition burners (a), and a row of burners in such a mode of operation (b).

DETAILED DESCRIPTION

Figure 1:
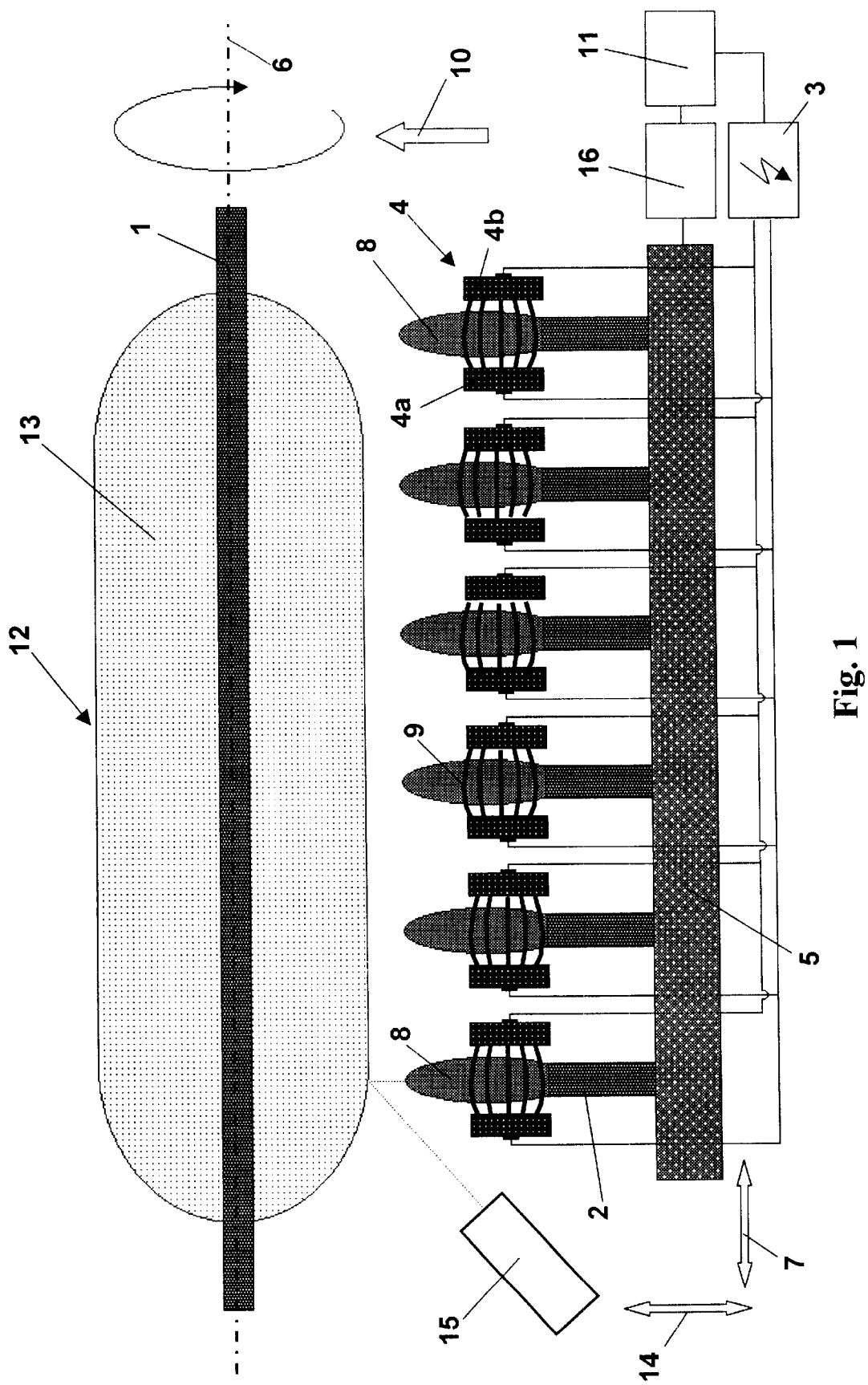

In the apparatus shown in FIG. 1, there is provided a carrier tube 1 of aluminum oxide along which a plurality of series-arranged flame hydrolysis burners 2 are arranged. The flame hydrolysis burners 2 are mounted on a common burner block 5 which can be reciprocated in parallel with the longitudinal axis 6 of the carrier tube 1 and is displaceable in a direction perpendicular thereto, as shown by the directional arrows 7 and 14. The burner block 5 is grounded. The burners 2 consist of quartz glass; their mutual distance is 15 cm.

Each of the burners 2 has assigned thereto a pair of electrodes 4 consisting of two plate electrodes 4a, 4b facing each other in pairs, each being connected to a pole of a high-voltage source 3. The plate electrodes 4a, 4b are mounted on the burner block 5 and are movable in synchronism with the burners 2. The planes of the flat sides of the plate electrodes 4a, 4b extend in a direction perpendicular to the longitudinal axis 6 of the carrier tube 1, enclosing the burner flame 8 of the respective burner 2 partly thereinbetween. An electrical field 9 which is symbolized by field lines in FIG. 1 can be produced by means of the plate electrodes 4a, 4b in the area of the burner flame 8. The field lines extend substantially in a direction perpendicular to the main propagation direction 10 of the burner flames 8 and in parallel with the longitudinal axis 6 of the carrier tube 1.

A control device 11 which is connected to the drive 16 for the burner block 5 and to the high-voltage source 3 is provided for controlling the movement of the burner block 5 and for adjusting the field strength of the electrical field 9.

$SiO_2$ particles are deposited by means of the burners 2 on the carrier tube 1 which is rotating about its longitudinal axis 6, so that the blank 13 is built up layerwise. To this end the burner block 5 is reciprocated along the longitudinal axis 6 of the carrier tube 1 between two reversal points that are stationary relative to the longitudinal axis 6. The amplitude of the reciprocating movement is characterized by means of the directional arrow 7. It is 15 cm and thus corresponds to the axial distance between the burners 2.

The burners 2 are each fed with oxygen and hydrogen as burner gases and with gaseous $SiCl_4$ as starting material for the formation of the $SiO_2$ particles. In case of a doping operation a starting substance is additionally supplied to the burners 2 for forming the dopant, such as $GeCl_4$ for forming $GeO_2$.

The temperature of the blank surface 12 is measured continuously. To this end a thermocamera 15 is directed onto the blank surface 12 at the point of impact of the burner flame 8. The thermocamera 15 is also connected to the burner block 5 and is reciprocated therewith.

During the deposition process the distance between the burner block 5 and the blank surface 12 is kept constant by moving the burner block 5 in the direction of the directional arrow 14 accordingly.

The electrical field 9 is increased in dependence upon the diameter of the developing blank 13 from the beginning of the deposition process in steps from 0 kV to 10 kV at the end of the method. At the beginning the maximum width of the burner flames 8 of the deposition burners 2 is 20 mm. The burner flames 8 are expanded with an increasing process duration in synchronism by about 50% of the initial value in that the field strength of the electrical field 9 is changed by means of the control device 11 in the area of the burner flames 8. To this end the voltage applied to the plate electrodes 4 by means of the high-voltage source 3 is changed accordingly, without a gas discharge being observed.

Further embodiments of the method according to the invention will be explained hereinafter, the same reference numerals as in FIG. 1 being used for designating identical or equivalent structural members or components of the apparatus.

FIG. 2(a) schematically shows the result of a deposition process before the use of the method of the invention. Due to wrong adjustments of the individual deposition burners 2 of the row 20 of burners and due to constructional differences in the deposition burners 2 or the respective gas supply lines among one another, there are different deposition characteristics of the deposition burners 2, which results in an axially non-uniform mass and density distribution and thus in an irregular shape of the surface 12 of the blank 13. The different deposition characteristics of the deposition burners 2 are illustrated in FIG. 2(a) by different widths of the burner flames 8. Each deposition burner 2 has assigned thereto an area of the blank, here designated as "deposition surface" 21.

The outer geometry of the blank 13 is measured after the end of the deposition process. On the basis of the shape and the outer diameter of the deposition surface 21, the deposition characteristics of the associated deposition burner 2 can be read. In dependence upon said reading, the deposition characteristics of the deposition burners 2 are adapted to one another by generating a time-constant electrical field 9 individually acting on the burner flame 8. With the help of the electrical field 9 the shape of the burner flames 8 differing from the desired shape is changed until they comply with the desired shape, resulting in a smooth homogeneous surface 12 of the blank in a subsequent deposition process, as is schematically illustrated in FIG. 2b.

Figure 2:
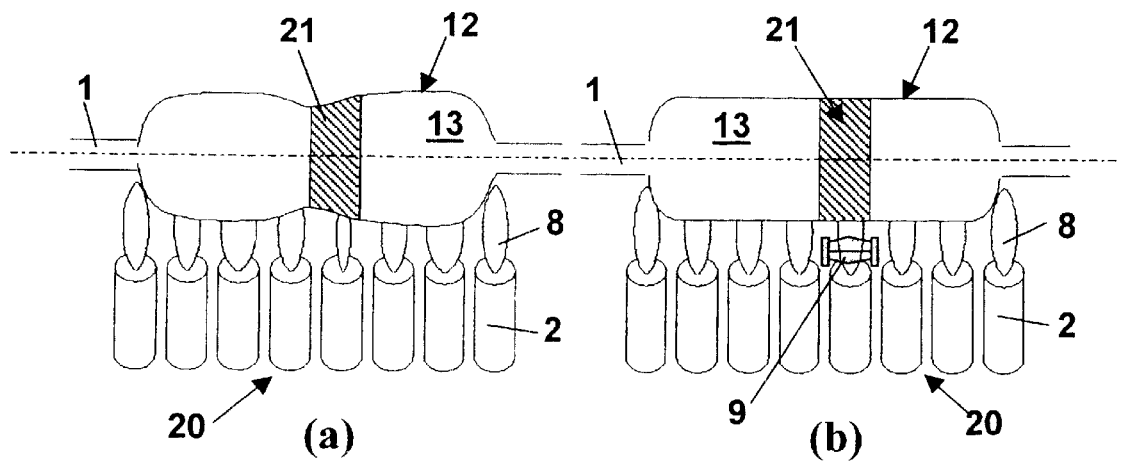
FIG. 2: the result of a deposition process prior to the use of the method according to the invention (a), in comparison with the result of the deposition process after use of the method according to the invention (b)
Figure 3:
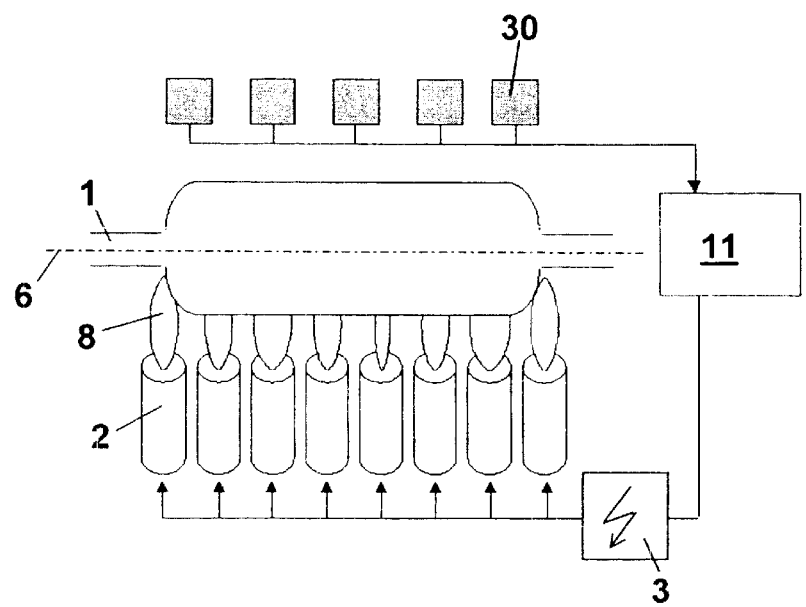
FIG. 3: a further embodiment of the method according to the invention.

As an alternative to the process explained with reference to FIG. 2, the outer geometry of the blank 13 is continuously monitored in the process schematically outlined in FIG. 3. To this end a plurality of diameter measuring devices 30 are evenly distributed over the length of blank 13. These are connected to a control device 11. In dependence upon the measurement values of the diameter measuring devices 30, the burner flames 8 of the deposition burners 2 are individually changed by means of the control device 11. To this end the width of each burner flame 8, when viewed in the direction of the longitudinal axis 6, can be individually varied by means of a separately controllable pair of electrodes which produces an electrical field 9 acting on the burner flame 8.

The diagram shown in FIG. 4a illustrates the change cycles of the diameter "d" of two neighboring burner flames (in relative units) of a stationary row of burners as a function of time "t". The continuous line 41 is assigned to the change cycle of the first burner flame, and the dotted line 42 to the change cycle of the second burner flame. The time required for passing through a change cycle (maximum to maximum) is about 10 seconds.

In the embodiment illustrated in FIG. 4a, the change cycles of the neighboring burner flames and thus of the electrical fields acting thereon accordingly are shifted in phase opposition. Therefore, the one deposition burner has a comparatively small burner flame which produces a high surface temperature, whereas the neighboring deposition burner has a comparatively broad burner flame at the same time, the broad burner flame producing a correspondingly low surface temperature.

This is illustrated by the schematic representation of the row of burners according to FIG. 4b. On account of the opposite "field change", the deposition burners 2 of the whole row of burners alternatingly show a burner flame 8 having a small diameter ($d_1$) and a large diameter ($d_2$). The "field change" takes place in synchronism for each of the two halves of the deposition burners 2.

In this mode of operation, a relatively small and thus hotter burner flame is always surrounded by two comparatively large and thus colder burner flames. Temperature peaks on the blank surface 12 can thereby be minimized.

What is claimed is:

1. A method for producing an $SiO_2$ blank, said method comprising:

forming $SiO_2$ particles in a burner flame of a deposition burner; and depositing said particles under the effect of an electrical field so as to form the $SiO_2$ blank by building up said $SiO_2$ blank on a substrate, said particles being deposited on a deposition surface of the $SiO_2$ blank as the $SiO_2$ blank is built up on the substrate;

said burner flame having a shape that is adjusted during said depositing by the effect of said electrical field dependent upon a changing geometrical parameter of the deposition surface of the $SiO_2$ blank as the $SiO_2$ blank is built up.

2. The method according to claim 1, wherein the deposition surface has a form of an outer cylindrical surface with an outer diameter, the outer diameter of said surface is determined, and a width of said burner flame is adjusted by said electrical field dependent upon said outer diameter.

3. The method according to claim 1, wherein the geometrical parameter of said deposition surface is determined continuously, and the shape of said burner flame is changed dependent upon the determined geometrical parameter.

4. The method according to claim 1, wherein said $SiO_2$ particles are formed in the burner flame of said deposition burner, and in a respective burner flame of one or more further deposition burners, said deposition burners being arranged along said substrate axially spaced from one another and relatively reciprocating relative to the blank in a predetermined sequence of movement in synchronism along the developing blank between reversal points, each of said deposition burners having associated therewith a respective portion of the deposition surface; and said geometrical parameter being determined for each portion of the deposition surface, the shape of the respective burner flame being individually adjusted by an associated electrical field dependent upon the determined geometrical parameter of the respective portion of the deposition surface.

5. The method according to claim 4, wherein said electrical fields each serve as a manipulated variable for control of the value of the geometrical parameter of the respective deposition surfaces.

6. The method according to claim 4, wherein the individual adjustment of said electrical fields assigned to said burner flames has superposed thereon a synchronous change in the respective electrical fields, said change being correlated with the sequence of movement.

7. The method according to claim 1, wherein said electrical field is adjusted so as to avoid a gas discharge.

8. The method according to claim 1, wherein the substrate is rotated about a longitudinal axis thereof and the $SiO_2$ blank is built up by deposition of said particles on said substrate as it rotates.

9. A method for producing an $SiO_2$ blank, said method comprising provideing a plurality of deposition burners that are arranged at equal distances from one another adjacent a substrate rotating about a longitudinal axis;

each of the deposition burners having a burner flame in which $SiO_2$ particles are formed and deposited under the effect of an electrical field so as to form the $SiO_2$ blank by building up said $SiO_2$ blank on said substrate;

the burner flames each having a respective width viewed in a direction parallel to the longitudinal axis of said substrate, the width of the burner flame being changed during the deposition of the particles and the formation or the $SiO_2$ blank in a predetermined change cycle by moans of the electrical field acting on said flame, such that the change cycles of neighboring burner fines arc synchronous and phase-shifted.

10. The method according to claim 9, wherein said change cycles of neighboring burner flames are in phase opposition.

* * * * *